US012710326B2

(12) United States Patent
Li et al.

(10) Patent No.: US 12,710,326 B2
(45) Date of Patent: Aug. 18, 2026

(54) TAXEL-BASED TACTILE SENSOR

(71) Applicant: Honda Motor Co., Ltd., Tokyo (JP)

(72) Inventors: Hongyu Li, Providence, RI (US); Nawid Jamali, San Francisco, CA (US); Soshi Iba, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 352 days.

(21) Appl. No.: 18/385,541

(22) Filed: Oct. 31, 2023

(65) Prior Publication Data

US 2025/0137859 A1 May 1, 2025

(51) Int. Cl.
*G01L 5/22* (2006.01)
*B25J 13/08* (2006.01)

(52) U.S. Cl.
CPC ............. *G01L 5/228* (2013.01); *B25J 13/084* (2013.01)

(58) Field of Classification Search
CPC ............................... G01L 5/228; B25J 13/084
See application file for complete search history.

(56) References Cited

U.S. PATENT DOCUMENTS

| | | | | |
|---|---|---|---|---|
| 11,341,826 B1 * | 5/2022 | Wiley | .................... | B25J 13/025 |
| 2013/0166484 A1 * | 6/2013 | Hartmann | ................ | G06N 3/08 706/16 |
| 2017/0059426 A1 * | 3/2017 | Choi | .................... | A61B 5/1036 |
| 2018/0243924 A1 * | 8/2018 | Visell | ...................... | G01L 5/228 |
| 2020/0272237 A1 * | 8/2020 | Dobson | ................. | G06F 3/0487 |
| 2021/0101292 A1 * | 4/2021 | Kuppuswamy | ........ | B25J 13/082 |
| 2022/0221356 A1 * | 7/2022 | Sarwar | .................... | G01L 5/228 |
| 2023/0294301 A1 * | 9/2023 | Kim | ....................... | B25J 13/084 |
| 2023/0330859 A1 * | 10/2023 | Tee | .......................... | G01L 1/18 |
| 2024/0058971 A1 * | 2/2024 | Guo | ...................... | B25J 15/083 |
| 2024/0094081 A1 * | 3/2024 | Aguilera | ................ | G01L 25/00 |
| 2024/0210260 A1 * | 6/2024 | Lu | ............................ | G01L 1/16 |
| 2025/0065493 A1 * | 2/2025 | Wang | ..................... | B25J 9/1605 |

OTHER PUBLICATIONS

Jean-Bastien Grill, Florian Strub, Florent Altché, Corentin Tallec, Pierre Richemond, Elena Buchatskaya, Carl Doersch, Bernardo Avila Pires, Zhaohan Guo, Mohammad Gheshlaghi Azar, Bilal Piot, koray kavukcuoglu, Remi Munos, and Michal Valko. Bootstrap Your Own Latent—A New Approach to Self-Supervised Learning. In Advances in Neural Information Processing Systems, vol. 33, pp. 21271-21284. Curran Associates, Inc., 2020. URL https://proceedings.neurips.cc/paper/2020/hash/f3ada80d5c4ee70142b17b8192b2958e-Abstract.html.

(Continued)

*Primary Examiner* — Helen C Kwok
(74) *Attorney, Agent, or Firm* — Rankin, Hill & Clark LLP

(57) ABSTRACT

A method for a taxel-based tactile sensor system includes receiving a set of taxel data having a subset of tactile data for an object and a subset of contact surface data for the object. The method also includes encoding the tactile data into a tactile embedding with a tactile encoder, and encoding the contact surface data into a surface embedding with a surface encoder. The method also includes computing a matrix of proximity values based on the tactile data encoded in the tactile embedding and contact surface data encoded in the surface embedding, and generating a tactile representation for the taxel data based on the proximity values.

20 Claims, 6 Drawing Sheets

(56) References Cited

OTHER PUBLICATIONS

Irmak Guzey, Ben Evans, Soumith Chintala, and Lerrel Pinto. Dexterity from Touch: Self-Supervised Pre-Training of Tactile Representations with Robotic Play, Mar. 2023. URL http://arxiv.org/abs/2303.12076.arXiv:2303.12076 [cs].

Thomas N. Kipf and Max Welling. Semi-Supervised Classification with Graph Convolutional Networks, Feb. 2017. URL http://arxiv.org/abs/1609.02907. arXiv:1609.02907 [cs, stat].

Charles Ruizhongtai Qi, Li Yi, Hao Su, and Leonidas J Guibas. PointNet++: Deep Hierarchical Feature Learning on Point Sets in a Metric Space. In I. Guyon, U. Von Luxburg, S. Bengio, H. Wallach, R. Fergus, S. Vishwanathan, and R. Garnett, editors, Advances in Neural Information Processing Systems, vol. 30. Curran Associates, Inc., 2017. URL https://proceedings.neurips.cc/paper/2017/file/d8bf84be3800d12f74d8b05e9b89836f-Paper.pdf.

Alec Radford, Jong Wook Kim, Chris Hallacy, Aditya Ramesh, Gabriel Goh, Sandhini Agarwal, Girish Sastry, Amanda Askell, Pamela Mishkin, Jack Clark, Gretchen Krueger, and Ilya Sutskever. Learning Transferable Visual Models From Natural Language Supervision. In Proceedings of the 38th International Conference on Machine Learning, pp. 8748-8763. PMLR, Jul. 2021. URL https://proceedings.mlr.press/v139/radford21a.html. ISSN: 2640-3498.

Yue Wang, Yongbin Sun, Ziwei Liu, Sanjay E. Sarma, Michael M. Bronstein, and Justin M. Solomon. Dynamic Graph CNN for Learning on Point Clouds, Jun. 2019. URL http://arxiv.org/abs/1801.07829. arXiv:1801.07829 [cs].

* cited by examiner

TAXEL-BASED TACTILE SENSOR

BACKGROUND

Available taxel-based sensors often have low resolution and are susceptible to high noise from interference sources for many potential tasks. Consequently, using raw taxel data can introduce errors and can increase inaccuracy in such tasks. As such, there is demand for a system framework capable of bridging the current gap between limited capabilities of taxel-based sensors and requirements of real-world applications.

BRIEF DESCRIPTION

According to one aspect, a method for a taxel-based tactile sensor system includes receiving a set of taxel data having a subset of tactile data for an object and a subset of contact surface data for the object. The method also includes encoding the tactile data into a tactile embedding with a tactile encoder, and encoding the contact surface data into a surface embedding with a surface encoder. The method also includes computing a matrix of proximity values based on the tactile data encoded in the tactile embedding and contact surface data encoded in the surface embedding, and generating a tactile representation for the taxel data based on the proximity values.

According to another aspect, a tactile sensor system includes a tactile sensor configured to contact an object and generate a set of taxel data having a subset of tactile data for the object and a subset of contact surface data for the object. The tactile sensor system also includes a processor configured to receive a set of taxel data having a subset of tactile data for an object and a subset of contact surface data for the object. The processor is also configured to encode the tactile data into a tactile embedding with a tactile encoder, and encode the contact surface data into a surface embedding with a surface encoder. The processor is also configured to compute a matrix of proximity values based on the tactile data encoded in the tactile embedding and contact surface data encoded in the surface embedding, and generate a tactile representation for the taxel data based on the proximity values.

According to another aspect, a non-transitory computer readable storage medium stores instructions that, when executed by a computer having a processor, causes the processor to perform a method. The method includes receiving a set of taxel data having a subset of tactile data for an object and a subset of contact surface data for the object, encoding the tactile data into a tactile embedding with a tactile encoder, and encoding the contact surface data into a surface embedding with a surface encoder. The method also includes computing a matrix of proximity values based on the tactile data encoded in the tactile embedding and the contact surface data encoded in the surface embedding, and generating a tactile representation for the taxel data based on the proximity values.

DETAILED DESCRIPTION

Figure 1:
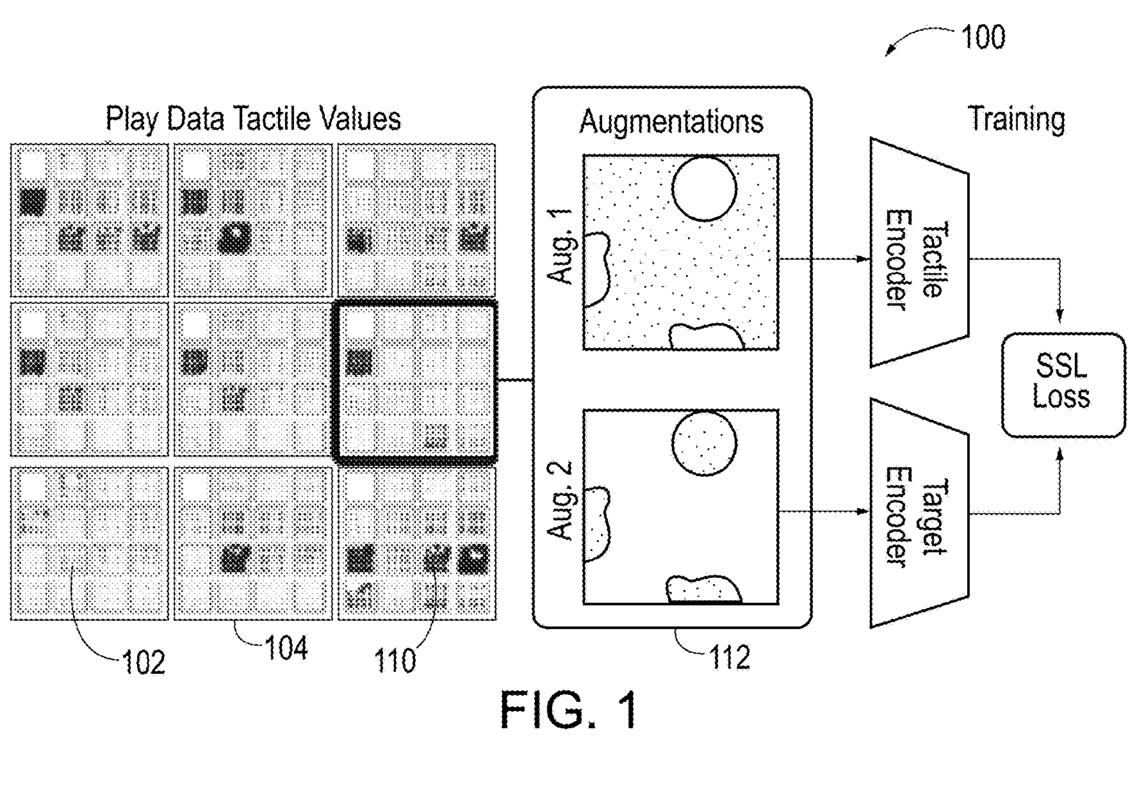
FIG. 1 is a diagram of a first known learning framework.

FIG. 1 depicts a first known learning framework 100 that is a self-supervised learning framework for producing taxel representations with taxel-based tactile sensor data. As shown in FIG. 1, the first known learning framework 100 includes a plurality of tactile senor pads 102 installed on a plurality of robot fingers 104 and configured to generate tactile sensor data. Each tactile sensor pad 102 supports a two-dimensional, 4×4 arrangement of taxels 110 which are concatenated into a communal tensor 112. The communal tensor 112 is processed as an image, where the first known learning framework is applied as a Bootstrap Your Own Latent learning framework for self-supervised learning.

Notably, the first known learning framework 100 requires that the sensor pads 102 are specifically arranged in two-dimensional space and have a same size and shape regarding taxel distribution. As such, the first known learning framework 100 lacks generalized applicability toward three-dimensional taxel arrangements, and toward sensor arrangements including tactile sensor pads having dissimilar taxel distributions with respect to shape and size.

Further, the first known learning framework 100 combines sensor data from the plurality of tactile sensor pads for simultaneous encoding. As such, the first known learning framework 100 also lacks generalized applicability toward varieties of robotic systems which employ dissimilar tactile sensor pad distributions and configurations.

Figure 2:
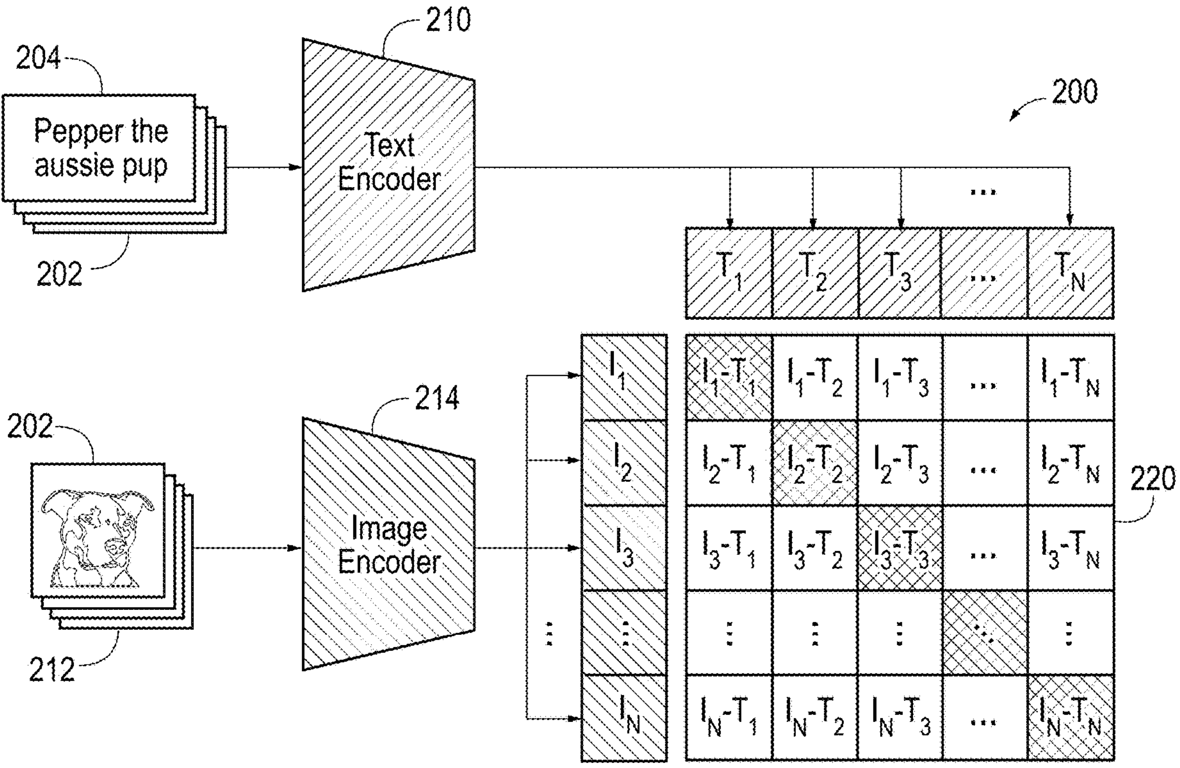
FIG. 2 is a diagram of a second known learning framework.

FIG. 2 depicts a second known learning framework 200 that is a Contrastive Language-Image Pretraining (CLIP) learning framework configured to associate text and images. The second learning framework 200 utilizes a dataset of image-caption pairs 202. Text captions 204 from the image-caption pairs 202 are passed into a text encoder 210, where the text captions 204 are encoded into text embeddings. Images 212 from the image-caption pairs 202 are passed into an image encoder 214, where the images 212 are encoded into image embeddings. The second known learning framework 200 calculates a dot product 220 between the text embeddings and the image embeddings.

In contrast to known learning frameworks, the systems and methods disclosed herein include a tactile representation learning framework configured to process raw taxel signals from a sensor system to create a robust and informative representation of tactile data. The tactile representation learning framework is configured to produce accurate and reliable results from a tactile sensor system, such that the representation created by the learning framework is applicable to a variety of downstream tasks, including taxel hyper-resolution, pose estimation, and dexterous manipulation of robotic system components.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also interconnect with components inside a device using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, connected thermometer, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), among others.

Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE, CAT-M, LoRa), satellite, dedicated short range communication (DSRC), among others.

"Communication interface" as used herein may include input and/or output devices for receiving input and/or devices for outputting data. The input and/or output may be for controlling different features, components, and systems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device or mobility device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms. The processor may also include any number of modules for performing instructions, tasks, or executables.

"User" as used herein may be a biological being, such as humans (e.g., adults, children, infants, etc.).

A "wearable computing device," as used herein can include, but is not limited to, a computing device component (e.g., a processor) with circuitry that can be worn or attached to user. In other words, a wearable computing device is a computer that is subsumed into the personal space of a user. Wearable computing devices can include a display and can include various sensors for sensing and determining various parameters of a user in a surrounding environment.

System Overview

Figure 3:
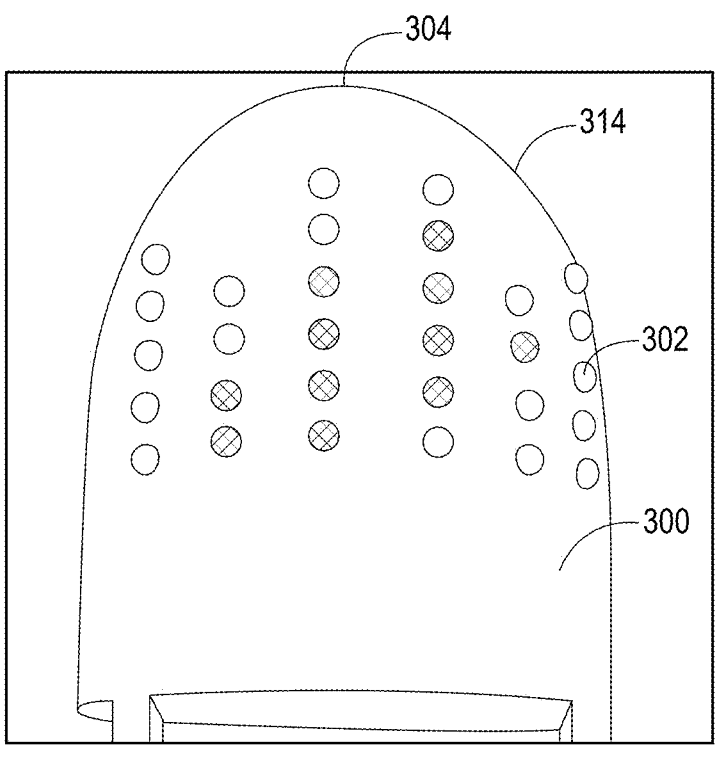
FIG. 3 is a perspective view of a tactile sensor.

Referring now to the drawings, the drawings are for purposes of illustrating one or more exemplary embodiments and not for purposes of limiting the same. FIG. 3 depicts a tactile sensor 300 supporting a plurality of taxels 302 arranged in three-dimensional space. In this regard, the tactile sensor 300 is curved and can form an end effector functional as a robotic fingertip.

Figure 4:
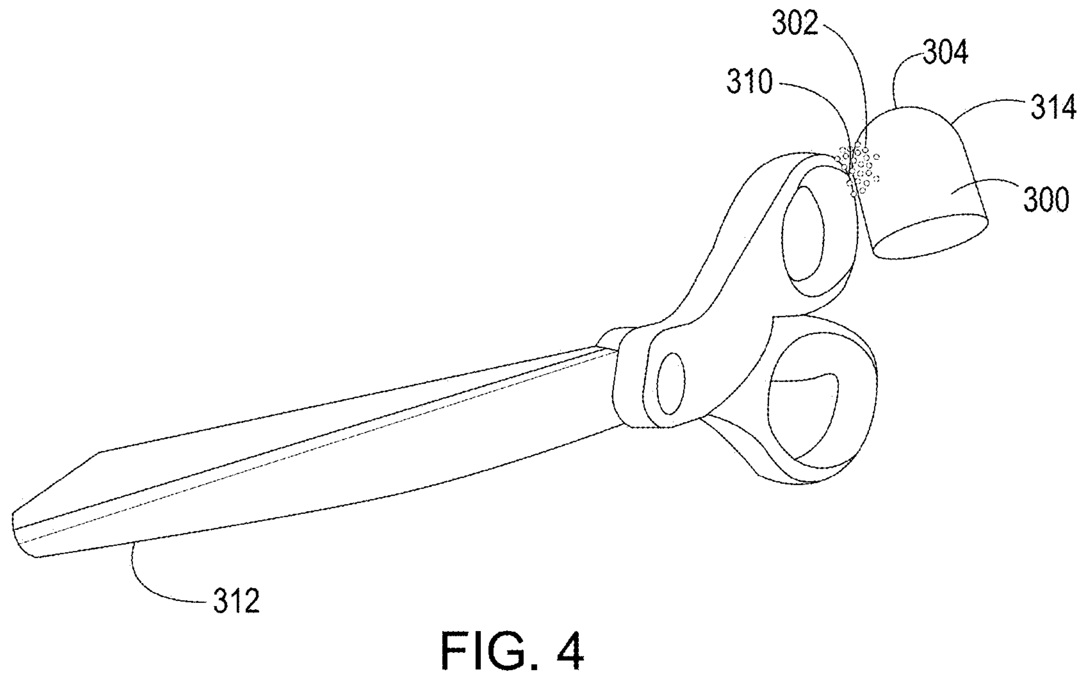
FIG. 4 is a perspective view of the tactile sensor contacting an object.

The taxels 302 are arranged on a sensor pad 304 of the tactile sensor 300. With reference to FIG. 4, the taxels 302 are configured to detect a force generated at a contact area 310 between the tactile sensor 300 and an object 312. Each taxel 302 is configured to generate a taxel signal indicating a direction or force generated at the taxel 302, in the contact area 310, when the tactile sensor 300 contacts the object 312.

In the depicted embodiment, each taxel 302 is configured to detect a linear force normal to an outer surface 314 of the sensor pad 304. In embodiments, each taxel sensor 102 may additionally or alternatively detect up to three perpendicular linear forces including the normal linear force, and additionally or alternatively detect up to three perpendicular rotational forces. While the object 312 depicted in FIG. 4 is a pair of scissors, the object 312 may be any everyday or household object, machine, article of manufacture, or synthetic object created from shape primitives detectable by the tactile sensor 300 without departing from the scope of the present disclosure.

Figure 5:
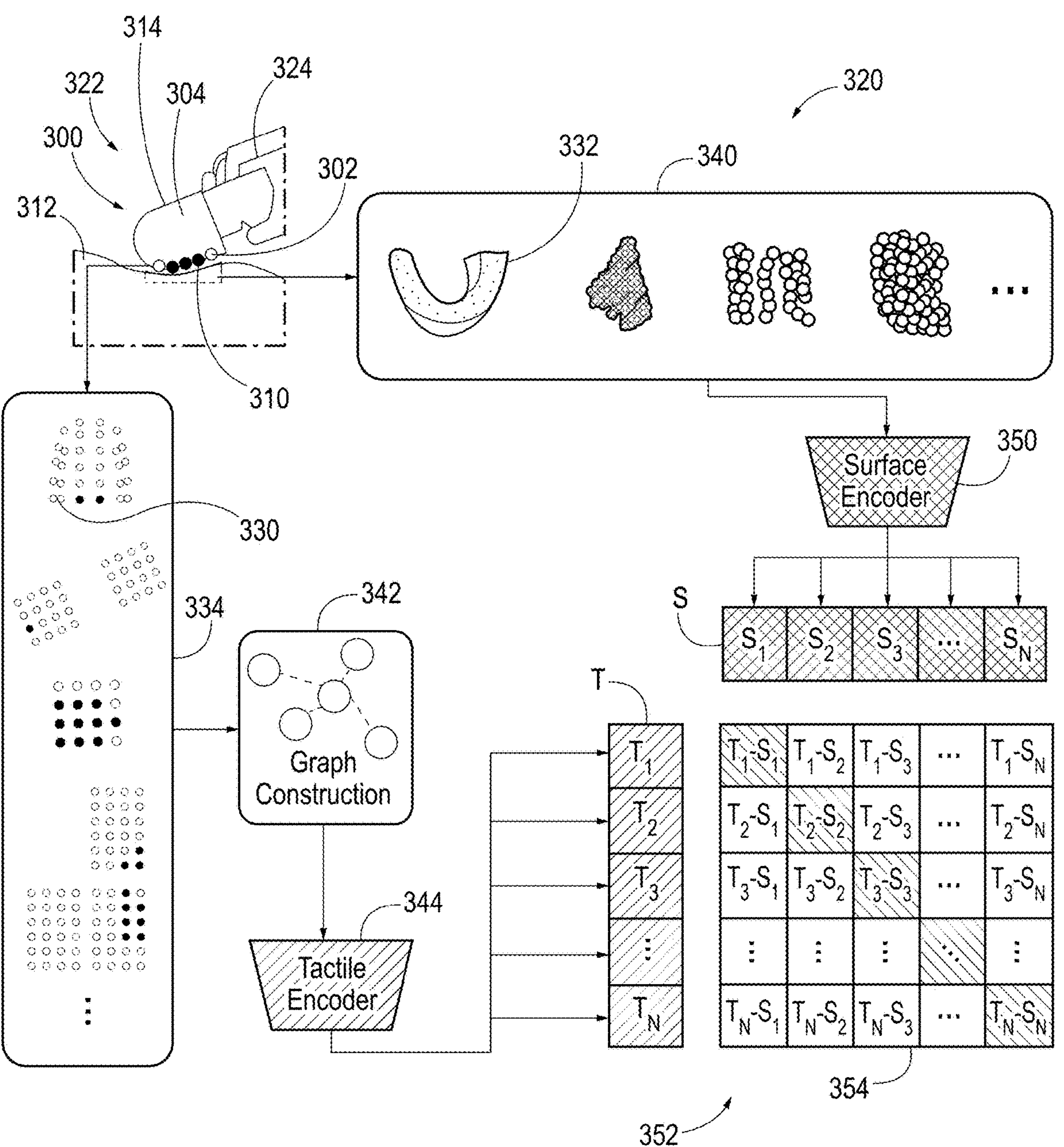
FIG. 5 is a diagram of a tactile representation learning framework.

FIG. 5 depicts a tactile representation learning framework 320 for a tactile sensor system 322. The tactile sensor system 322 includes the tactile sensor 300 mounted on a robotic arm 324 as an end effector for the robotic arm 324. The robotic arm 324 is a robotic fingertip configured to contact the object 312 with the tactile sensor 300. As shown in FIG. 5, when the tactile sensor 300 contacts the object 312, the taxels 302 generate a set of taxel data including a subset of tactile data 330 and a corresponding subset of contact surface data 332 for the object 312.

The subset of tactile data 330 generated by the taxels 302 is stored in a first database 334, and the corresponding subset of contact surface data 332 is stored in a second database 340. The first database 334 and the second database 340 are mutually exclusive, such that the subset of tactile data 330 and the subset of contact surface data 332 are processed separately in the tactile representation learning framework 320.

The subset of tactile data 330 and the subset of contact surface data 332 are generated from a plurality of contacts with the object 312, where each contact corresponds to a pair of data points in the taxel data. The tactile sensor 300, the taxels 302, and the object 312 may each feature a plurality of configurations having different shapes and sizes in the plurality of contacts.

In this regard, the tactile sensor 300 may employ curved tips, square or rectangular edges, and a variety of other structures having different shapes and sizes for supporting the taxels 302. Also, the taxels 302 may be provided in a variety of spatial arrangements on the tactile sensor 300, in a variety of distribution patterns, with varying numerosity in the plurality of contacts. Further, the object 312 contacted by the tactile sensor 300 may be any one of a variety of objects employed for each contact in the plurality of contacts.

As depicted in FIG. 5, data points in the subset of contact surface data 332 stored in the second database 340 are each represented as a point cloud. While, as depicted, the data points in the subset of contact surface data 332 are represented as point clouds, the data points may be additionally or alternatively represented in other three-dimensional forms which describe a contour of the object 312, including mesh models and signed distance field (SDF) models without departing from the scope of the present disclosure.

The tactile representation learning framework 320 includes a graphing module 342 configured to receive the subset of tactile data 330 stored in the first database 334, and represent the subset of tactile data 330 as a graph. The tactile representation learning framework 320 also includes a tactile encoder 344 configured to receive the subset of tactile data 330 graphed by the graphing module 342, and encode the subset of tactile data 330 into a tactile embedding T. The tactile representation learning framework 320 also includes a surface encoder 350 configured to receive the subsets of contact surface data 332 from the second database 340, and encode the subsets of contact surface data 332 into a surface embedding S.

With continued reference to FIG. 5, the tactile representation learning framework 320 also includes a representation module 352 configured to produce a matrix 354 as a learned representation of the contact area 310 between the tactile sensor 300 and the object 312. The representation module 352 computes the matrix 354 from a dot product operation of the tactile embedding T and the surface embedding S. The tactile embedding T and the surface embedding S have a same size, and the dot product operation produces the matrix 354 with a length and width matching the size of the tactile embedding T and the surface embedding S.

The tactile encoder 344 and the surface encoder 350 are optimized using a loss function, such that the matrix 354 becomes an identity matrix. In a downstream application of the tactile representation learning framework 320 including the optimized tactile encoder 344, the tactile representation learning framework 320 receives tactile data for an object, and stores the tactile data in the first database 334. The tactile representation learning framework 320 then encodes the tactile data into a downstream tactile embedding with the tactile encoder 344, as optimized.

In an embodiment of the downstream application, the tactile sensor 300 contacts the object 312 and generates taxel data, including a subset of tactile data for the object 312. The subset of tactile data generated by the tactile sensor 300 in the downstream application is stored in the first database 334 and encoded into a downstream tactile embedding with the tactile encoder 344, as optimized.

In this manner, the tactile representation learning framework 320 generates a representation of the contact area 310 between the tactile sensor 300 and the object 312. The generated representation may be employed in the tactile sensor system 322 to perform at least one of pose estimation and dexterous manipulation of the robotic arm 324 based on the tactile encoder 344, as optimized.

While, in the depicted embodiment, the downstream application of the optimized tactile encoder 344 is executed using the tactile sensor system 322 and the tactile sensor 300, the tactile representation learning framework 320, including the optimized tactile encoder 344 may be transmitted to and executed by a variety of tactile sensor systems which employ a variety of tactile sensor arrangements in three-dimensional space without departing from the scope of the present disclosure.

Figure 6:
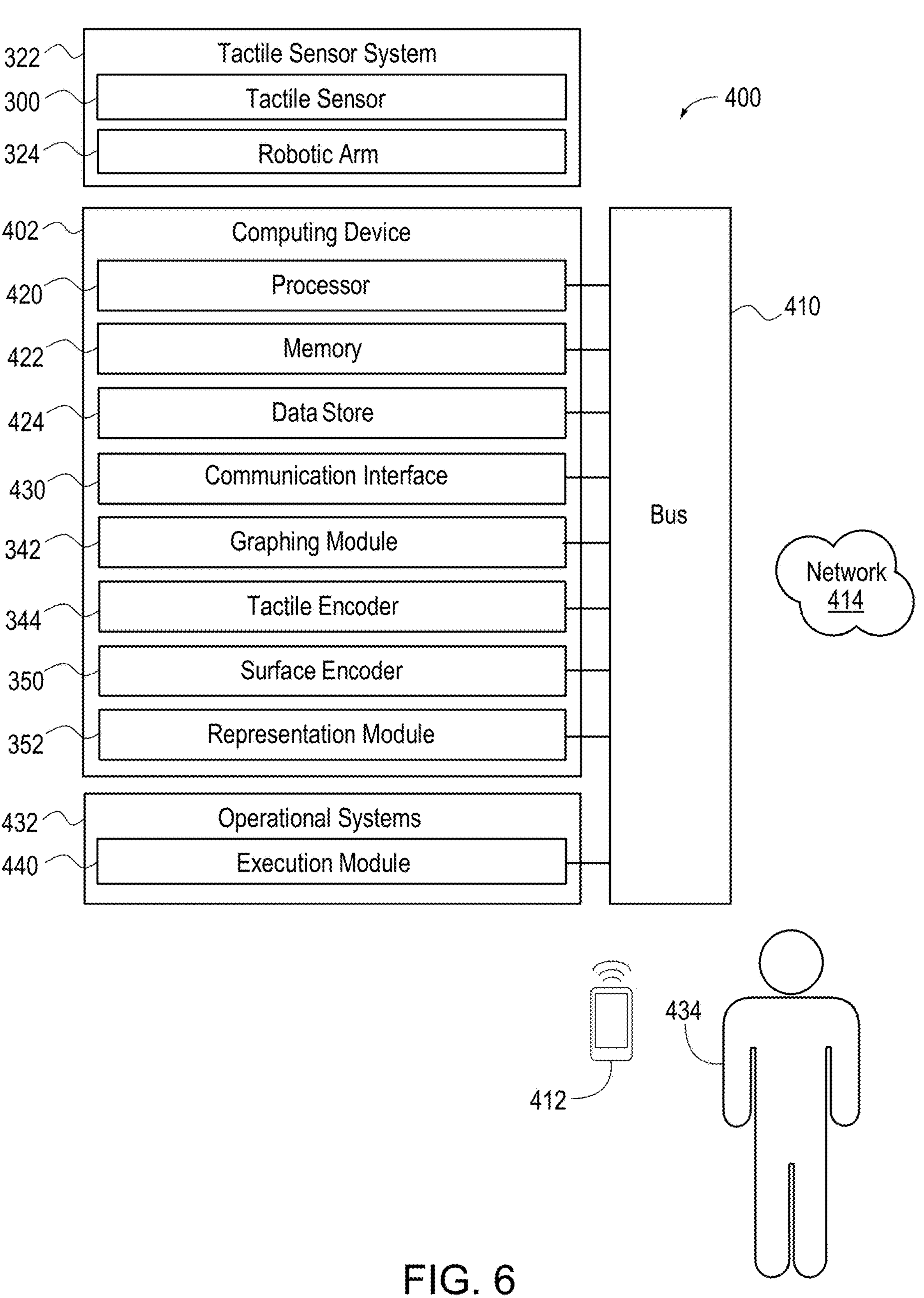
FIG. 6 is an exemplary operating environment of a tactile sensor system for generating a tactile representation.

FIG. 6 is an exemplary component diagram of an operating environment 400 for generating a tactile representation based on taxel data, according to one aspect. The operating environment includes the tactile sensor system 322, a computing device 402, and operational systems 404. The tactile sensor system 322, the computing device 402, and the operational systems 404 may be interconnected by a bus 410. The components of the operating environment 400, as well as the components of other systems, hardware architectures, and software architectures discussed herein, may be combined, omitted, or organized into different architectures for various embodiments. The computing device 402 may be implemented with a device or remotely stored.

The computing device 402 may be implemented as a part of the tactile sensor system 322. The computing device 402 may be implemented as part of a telematics unit or an electronic control unit among other potential aspects of the tactile sensor system 322. In other embodiments, the components and functions of the computing device 402 can be implemented with other devices such as a portable device 412, database, remote server, or another device connected via a network (e.g., a network 414).

The computing device 402 may be capable of providing wired or wireless computer communications utilizing various protocols to send and receive electronic signals internally to and from components of the operating environment 400. Additionally, the computing device 402 may be operably connected for internal computer communication via the bus 410 (e.g., a Controller Area Network (CAN) or a Local Interconnect Network (LIN) protocol bus) to facilitate data input and output between the computing device 402 and the components of the operating environment 400.

The computing device 402 includes a processor 420, a memory 422, a data store 424, and a communication interface 430, which are each operably connected for computer communication via the bus 410 and/or other wired and wireless technologies. The communication interface 430 provides software and hardware to facilitate data input and output between the components of the computing device 402 and other components, networks, and data sources, which will be described herein. Additionally, the computing device 402 also includes the graphing module 342, the tactile encoder 344, the surface encoder 350, and the representation module 352 for processing taxel data from the tactile sensor system 322 and generating a representation of the contact area 310.

The computing device 402 is also operably connected for computer communication (e.g., via the bus 410 and/or the communication interface 430) to one or more operational systems 432. The operational systems 432 can include, but are not limited to, any automatic or manual systems that can be used to enhance the tactile sensor system 322, and facilitate operation of the tactile sensor system 322 by a user 434. The operational systems 432 include an execution module 440. The execution module 440 monitors, analyzes, and/or operates the tactile sensor system 322, to some degree. For example, the execution module 440 may store, calculate, and provide information about the tactile sensor system 322, such as previous usage statistics, including taxel data from previous use.

The operational systems 432 also include and/or are operably connected for computer communication to the tactile sensor system 322. For example, one or more sensors of the tactile sensor system 322 may be incorporated with execution module 440 to monitor characteristics of the tactile sensor system 322 such as location, position of the tactile sensor system 322, etc. In another embodiment, the tactile sensor system 322 may communicate with one or more devices or services (e.g., a wearable computing device, non-wearable computing device, cloud service, etc.) to monitor characteristics of an environment surrounding the tactile sensor system 322.

The tactile sensor system 322, the computing device 402, and/or the operational systems 432 are also operatively connected for computer communication to and via the network 414. The network 414 is, for example, a data network, the Internet, a wide area network (WAN) or a local area (LAN) network. The network 414 serves as a communication medium to various remote devices (e.g., databases, web servers, remote servers, application servers, intermediary servers, client machines, or other portable devices).

The operating environment 400 facilitates improved performance by the tactile sensor system 322 by transforming raw taxel signals into a more informative representation of the object 312. Detailed embodiments describing exemplary methods using the system and network configuration discussed above will now be discussed in detail.

II. Methods for a Taxel-Based Tactile Sensor System

Figure 7:
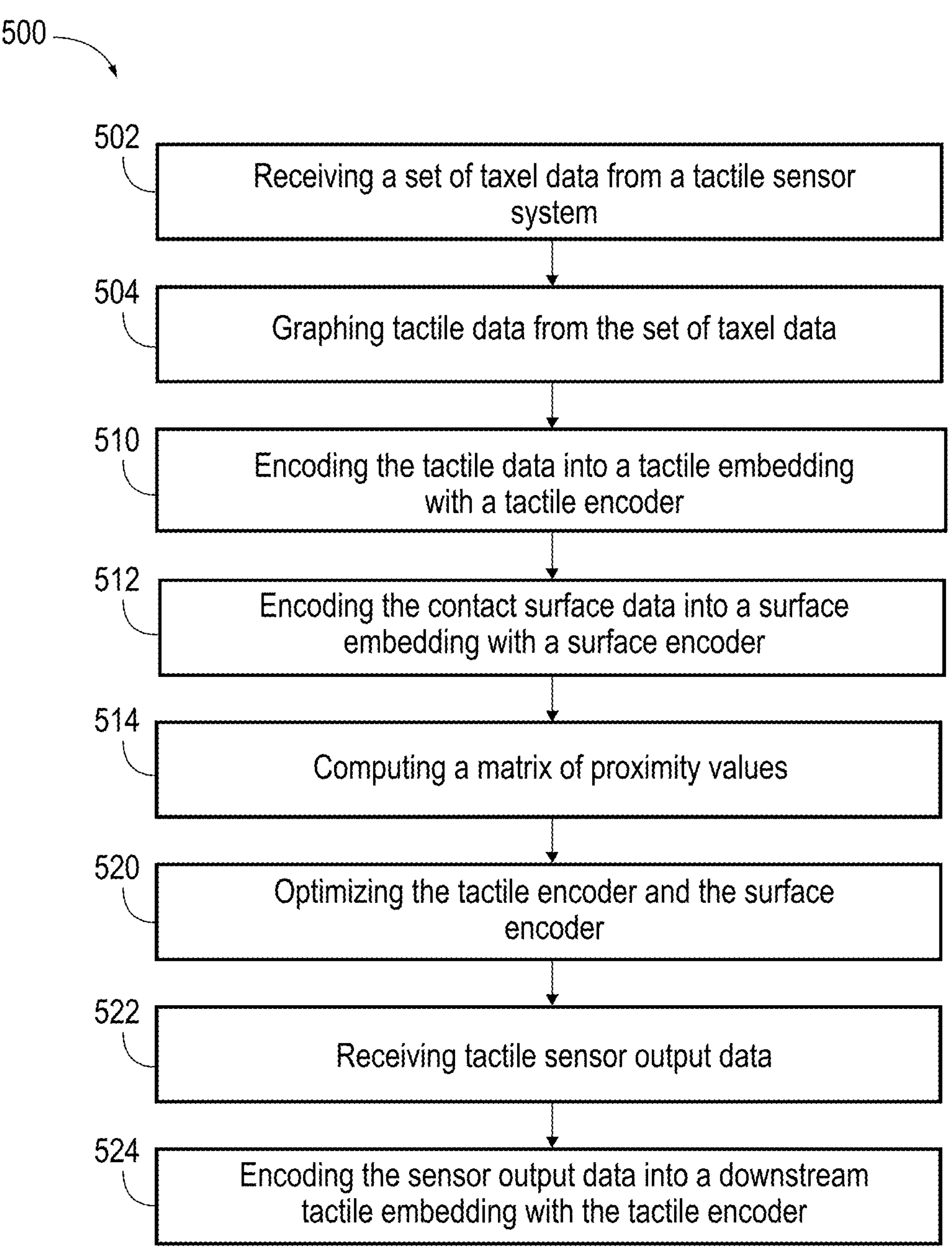
FIG. 7 is an exemplary process flow for generating a tactile representation with the tactile sensor system.

Referring to FIG. 7, a method 500 for a taxel-based tactile sensor system will be described according to an exemplary embodiment. FIG. 7 will be described with reference to FIGS. 5 and 6. For simplicity, the method 500 will be described as a sequence of blocks, but the elements of the method 500 can be organized into different architectures, elements, stages, and/or processes.

At block 502, the method 500 includes receiving the set of taxel data from the tactile sensor system 322, the set of taxel data having the subset of tactile data 330 for the object 312 and the subset of contact surface data 332 for the object 312. The subset of tactile data 330 is stored in the first database 334, and the subset of contact surface data 332 is stored in the second database 340, where the subset of tactile data 330 and the subset of contact surface data 332 for the object 312 are mutually exclusive stores of data.

The subset of tactile data 330 and the subset of contact surface data 332 correspond to a plurality of contacts between the tactile sensor 300 and a plurality of objects, including the object 312. The plurality of objects associated with the subset of tactile data 330 have shapes and sizes that are different from each other. In this manner, the taxel data generated by the tactile sensor system 322 is generalized toward objects having a plurality of shapes and sizes.

Among the plurality of contacts recorded by the tactile sensor system 322, the subset of tactile data 330 includes the taxels 302 provided on a plurality of sensor pad arrangements having shapes and sizes that are different from each other, and provided in a plurality of distribution patterns on the sensor pad arrangements. When generating taxel data used to optimize the tactile encoder 344 and the surface encoder 350, the tactile sensor system 322 employs the tactile sensor 300 individually such that, at each recorded contact, the tactile sensor system 322 contacts the object 312 with the sensor pad 304 to generate taxel data with a single sensor. As such, each tactile data point in the subset of the tactile data 330 is generated by a single sensor pad supporting the plurality of taxels 302.

The taxel data generated by the tactile sensor system 322 indicates positions and forces associated with the taxels 302 on the sensor pad 304 of the tactile sensor 300 in a three-dimensional arrangement. In this regard, the taxel data includes a matrix of taxel signals generated from the taxels 302, where each taxel signal indicates at least one of a linear force and a rotational force generated from contact with the object 312.

The matrix of taxel signals generated from the taxels 302 may be expressed as $K \in R^{t\times 1}$, where t×1 indicates a number of types of forces and a number of axes of forces detected by the taxels 302. While, in the depicted embodiment, the taxels 302 detect linear forces in a single axis normal to the outer surface 314 of the sensor pad 304, the taxels 302 may detect at least one of linear forces and rotational forces in up to three axes without departing from the scope of the present disclosure. As such, t×1 may have a value up to t×6 to describe each force detected by the taxels 302.

At block 504, the method 500 includes graphing the subset of tactile data 330 as a plurality of nodes using the graphing module 342, where each node is a tuple of values indicating a taxel position and a taxel signal for each taxel 302. The taxel position may be expressed as $R^{t\times 3}$, where t×3 indicates a position of a taxel 302 with respect to other taxels 302, the sensor pad 304, and the robotic arm 324.

The graphing module 342 receives the subset of tactile data 330 as raw tactile data from the tactile sensor system 322, and graphs the subset of tactile data 330 for further processing at the tactile encoder 344. When graphing the subset of tactile data 330, the graphing module 342 concatenates the tuples of values defining each node into a matrix that may be expressed as $R^{t\times 4}$, where t×4 indicates both a position of a taxel 302 with respect to other taxels 302, the sensor pad 304, and the robotic arm 324, and indicates a single normal force detected by the taxel 302. As such, t×4 may have a value up to t×9 to indicate the position of the taxel 302, linear forces along three axes of the taxel 302, and rotational forces along three axes of the taxel 302.

With each tactile data point in the subset of the tactile data 330 generated by a single sensor pad supporting the taxels 302, the graphing module 342 concatenates taxel data from a single sensor, that is the tactile sensor 300 with the sensor pad 304. In this manner, tactile encoder 344, once optimized, is generalized for a variety of sensor configurations, including configurations with multiple sensor pads. The graphing module 342 may graph the nodes in a k-nearest neighbor graph, a radius graph, and variety of other spatial graphs and constructions for processing by the tactile encoder 344.

At block 510, the method 500 includes encoding the subset of tactile data 330 into the tactile embedding T with the tactile encoder 344. In this regard, the tactile encoder 344 encodes graphed tactile data transmitted from the graphing module 342 into the tactile embedding T. More specifically, the tactile encoder 344 encodes each concatenated tuple of values from the graphing module 342 into the tactile embedding T. The tactile embedding T may be expressed as $T \in R^n$, where n represents an embedding size.

The tactile encoder 344 is modeled by a graph neural network (GNN). The GNN may be any one of a variety of GNNs, including a graph convolutional network, and EdgeConv for processing the graphed tactile data received from the graphing module 342.

At block 512, the method 500 includes encoding the contact surface data into the surface embedding S with the surface encoder 350. In an embodiment, the tactile encoder 344 and the surface encoder 350 draw random pairs of data points from the subset of tactile data 330 and the subset of contact surface data 332, where the tactile embedding T and the surface embedding S are computed using the random pairs.

The surface embedding S may be expressed as a vector $S \in R^n$ which represents a contour of the object 312, such as a flat or curved surface, where the tactile sensor 300 contacts the object 312. The tactile embedding T and the surface embedding S are feature vectors having a same size $R^n$.

The processor 420 computes raw data from the tactile sensor system 322 to determine the subset of contact surface data 332 as at least one of a signed distance field (SDF) model, a point cloud, and a mesh describing contours of the object 312. As such, encoding the subset of contact surface data 332 includes encoding the at least one of the SDF model, the point cloud, and the mesh with the surface encoder 350.

At block 514, the method includes computing the matrix 354, which is a matrix of proximity values based on the subset of tactile data 330 encoded in the tactile embedding T and the subset of contact surface data 332 encoded in the surface embedding S. In this regard, computing the matrix 354 includes computing a dot product $T \cdot S^T$ of the subset of tactile data 330 encoded in the tactile embedding T and the subset of contact surface data 332 encoded in the surface embedding S. In this manner, each proximity value computed in the matrix 354 is a dot product of a tactile data point of the subset of tactile data 330 and a contact surface data point of the subset of contact surface data 332.

As the tactile embedding T and the surface embedding S have the same size $R^n$, the dot product operation performed by the representation module 352 produces the matrix 354 with a size of n×n. The dot product operation indicates a cosine similarity between the tactile embedding T and surface embedding S in the matrix 350.

At block 520, the method 500 includes optimizing the tactile encoder 344 and the surface encoder 350. More specifically, the representation module 352 optimizes the tactile encoder 344 and the surface encoder 350 using a loss function, such that the matrix 354 becomes an identity matrix $\|^{n\times n}$. In this regard, the representation module 352 may employ a binary cross-entropy loss function, a mean-squared error function, a Huber loss function, a hinge loss function, and a variety of other loss functions which transform the matrix 354 into the identity matrix.

As such, the representation module 352 generates a tactile representation for the taxel data received from the tactile sensor system 322 based on the proximity values in the matrix 354. The tactile representation generated by the representation module 352 is provided in a latent space, where the tactile representation positions pairs of proximity values in the latent space based on a degree of matching. To this end, the representation module 352 positions pairs of proximity values with a relatively high degree of matching closer together, as compared to pairs of proximity values with a relatively low degree of matching.

Downstream applications of the optimized tactile encoder 344 facilitate processing even low resolution taxel signals into a high-fidelity representation of a contact area between a sensor and a detected surface. In this regard, at block 522 the method includes receiving tactile sensor output data, including a downstream set of tactile data at the first database 334. The sensor output data may be transmitted and received from the tactile sensor system 322 or another taxel-based sensor system via the network 414.

At block 524, the method 500 includes encoding the sensor output data, including the downstream tactile data, into a downstream tactile embedding with the tactile encoder 344, as optimized. In this manner the tactile encoder 344, as optimized, may be employed in a variety of downstream tasks including taxel hyper-resolution, pose estimation, and dexterous manipulation with a robotic appendage and associated end effector, such as the robotic arm 324 and the tactile sensor 300. The downstream tactile embedding output from the optimized tactile encoder 344 may indicate pressure, texture, friction, weight, center of mass, stiffness, and other aspects that may be associated with a contact area between the tactile sensor 300 and the object 312.

Figure 8:
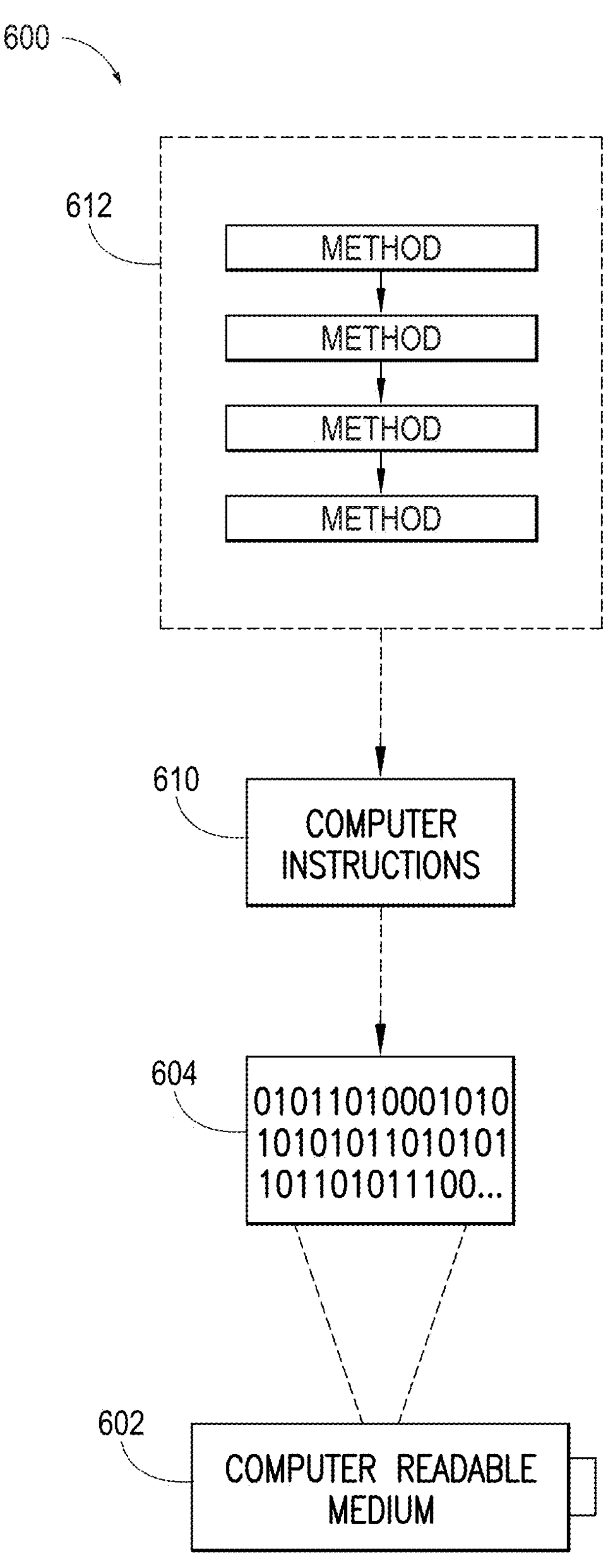
FIG. 8 is an illustration of a computer-readable medium or computer-readable device including processor-executable instructions configured to embody one or more of the provisions set forth herein, according to one aspect.

Still another aspect involves a non-transitory computer-readable medium including processor-executable instructions configured to implement one aspect of the techniques presented herein. An aspect of a computer-readable medium or a computer-readable device devised in these ways is illustrated in FIG. 8, where an implementation 600 includes a computer-readable medium 602, such as a CD-R, DVD-R, flash drive, a platter of a hard disk drive, etc., on which is encoded computer-readable data 604. This encoded computer-readable data 604, such as binary data including a plurality of zero's and one's as shown in 604, in turn includes a set of processor-executable computer instructions 610 configured to operate according to one or more of the principles set forth herein. In this implementation 600, the processor-executable computer instructions 610 may be configured to perform a method 612, such as the method 500 of FIG. 7. In another aspect, the processor-executable computer instructions 610 may be configured to implement a system, such as the operating environment 400 of FIG. 6. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, various presently unforeseen or unanticipated alternatives, modifications, variations or improvements therein may be subsequently made by those skilled in the art which are also intended to be encompassed by the following claims.

The invention claimed is:

1. A method for a taxel-based tactile sensor system, the method comprising:

receiving a set of taxel data having a subset of tactile data for an object and a subset of contact surface data for the object, wherein the subset of tactile data is generated by the taxel-based tactile sensor system contacting a surface of the object, and the subset of contact surface data includes a representation of a geometry of the surface of the object;

encoding the tactile data into a tactile embedding with a tactile encoder;

encoding the contact surface data into a surface embedding with a surface encoder;

computing a matrix of proximity values based on the tactile data encoded in the tactile embedding and the contact surface data encoded in the surface embedding; and generating a tactile representation for the taxel data based on the proximity values.

2. The method of claim 1, wherein computing the matrix of proximity values includes computing a dot product of the tactile data encoded in the tactile embedding and the contact surface data encoded in the surface embedding, wherein each proximity value is a dot product of a tactile data point of the tactile data and a contact surface data point of the contact surface data.

3. The method of claim 1, wherein generating the tactile representation includes generating the tactile representation in a latent space, wherein the tactile representation positions pairs of proximity values in the latent space based on a degree of matching, wherein pairs of proximity values with a relatively high degree of matching are positioned closer together as compared to pairs of proximity values with a relatively low degree of matching.

4. The method of claim 1, further comprising graphing the tactile data as a plurality of nodes, wherein each node is a tuple of values indicating a taxel position and a taxel signal, wherein encoding the tactile data into the tactile embedding includes encoding the graphed tactile data with the tactile encoder.

5. The method of claim 4, further comprising concatenating each tuple into a matrix, wherein each concatenated tuple is encoded with the tactile encoder.

6. The method of claim 1, wherein each tactile data point of the tactile data is generated by a single sensor pad supporting a plurality of taxels.

7. The method of claim 1, wherein the tactile encoder is modeled by a graph neural network.

8. The method of claim 1, further comprising determining at least one of a signed distance field (SDF) model, a point cloud, and a mesh as the contact surface data, wherein encoding the contact surface data includes encoding the at least one of the SDF model, the point cloud, and the mesh with the surface encoder.

9. The method of claim 1, wherein the tactile data includes a matrix of taxel signals, wherein each taxel signal indicates a position and at least one of a linear force and a rotational force.

10. The method of claim 1, wherein the subset of tactile data corresponds to contacts with a plurality of objects having shapes and sizes that are different from each other.

11. The method of claim 1, wherein the tactile embedding is a feature vector, and the surface embedding is a feature vector having a same length as the tactile embedding.

12. The method of claim 1, further comprising optimizing at least one of the tactile encoder and the surface encoder using a loss function.

13. The method of claim 1, wherein the taxel data indicates taxels provided on a sensor pad in a three-dimensional arrangement.

14. The method of claim 1, wherein the taxel data indicates taxels provided on a plurality of sensor pad arrangements having shapes and sizes that are different from each other.

15. The method of claim 1, further comprising drawing random pairs of data points from the subset of tactile data and the subset of contact surface data, wherein the tactile embedding and the surface embedding are computed using the random pairs of data points.

16. The method of claim 1, wherein the subset of tactile data and the subset of contact surface data for the object are mutually exclusive stores of data.

17. The method of claim 1, further comprising receiving sensor output data; and encoding the sensor output data into a downstream tactile embedding with the tactile encoder.

18. A tactile sensor system comprising:

a tactile sensor configured to contact an object and generate a set of taxel data having a subset of tactile data for the object and a subset of contact surface data for the object, wherein the subset of tactile data is generated by the taxel-based tactile sensor system contacting a surface of the object, and the subset of contact surface data includes a representation of a geometry of the surface of the object; and a processor configured to:

receive the set of taxel data from the tactile sensor;

encode the tactile data into a tactile embedding with a tactile encoder;

encode the contact surface data into a surface embedding with a surface encoder;

compute a matrix of proximity values based on the tactile data encoded in the tactile embedding and the contact surface data encoded in the surface embedding; and generate a tactile representation for the taxel data based on the proximity values.

19. The system of claim 18, further comprising a robotic arm having an end effector, wherein the tactile sensor is mounted on the robotic arm, wherein the processor is configured to:

receive sensor output data from the tactile sensor;

encode the sensor output data into a downstream tactile embedding with the tactile encoder; and perform at least one of pose estimation and dexterous manipulation of the end effector based on the downstream tactile embedding and the tactile encoder.

20. A non-transitory computer readable storage medium storing instructions that, when executed by a computer having a processor, causes the processor to perform a method, the method comprising:

receiving a set of taxel data having a subset of tactile data for an object and a subset of contact surface data for the object, wherein the subset of tactile data is generated by the taxel-based tactile sensor system contacting a surface of the object, and the subset of contact surface data includes a representation of a geometry of the surface of the object;

encoding the tactile data into a tactile embedding with a tactile encoder;

encoding the contact surface data into a surface embedding with a surface encoder;

computing a matrix of proximity values based on the tactile data encoded in the tactile embedding and the contact surface data encoded in the surface embedding; and generating a tactile representation for the taxel data based on the proximity values.

* * * * *